(12) United States Patent
Ucar

(10) Patent No.: US 10,075,749 B2
(45) Date of Patent: *Sep. 11, 2018

(54) TRANSPORT STREAM MULTIPLEXERS AND METHODS FOR PROVIDING PACKETS ON A TRANSPORT STREAM

(71) Applicant: Integrated Device Technology, Inc., San Jose, CA (US)

(72) Inventor: Haluk Ucar, Sunnyvale, CA (US)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/015,568

(22) Filed: Feb. 4, 2016

(65) Prior Publication Data

US 2016/0156947 A1    Jun. 2, 2016

Related U.S. Application Data

(60) Continuation of application No. 14/806,539, filed on Jul. 22, 2015, now Pat. No. 9,277,254, which is a
(Continued)

(51) Int. Cl.
*H04N 21/2389* (2011.01)
*H04N 21/236* (2011.01)
(Continued)

(52) U.S. Cl.
CPC ...... *H04N 21/23892* (2013.01); *H04H 20/30* (2013.01); *H04L 65/4076* (2013.01);
(Continued)

(58) Field of Classification Search
CPC ....... H04N 21/23892; H04N 21/23611; H04N 21/23605; H04N 21/23109;
(Continued)

(56) References Cited

U.S. PATENT DOCUMENTS 7,764,717 B1    7/2010   Yu et al.
9,118,425 B2    8/2015   Ucar
(Continued)

FOREIGN PATENT DOCUMENTS

JP    H10242928    11/1998
JP    H11275147    8/1999
(Continued)

OTHER PUBLICATIONS

First Office Action received for Appln No. 2870329 dated Dec. 30, 2015.
(Continued)

*Primary Examiner* — Ajay Cattungal
(74) *Attorney, Agent, or Firm* — Christopher P. Maiorana, PC

(57) ABSTRACT

Examples described include transport stream multiplexers that may not need to search for an appropriate source to use to generate a transport stream packet. Instead, the source to use may be indicated by a position (e.g. an entry) in a memory table, e.g. a metadata array. Methods for placing transport stream packets on a transport stream and initializing the metadata array are also described.

20 Claims, 7 Drawing Sheets

Related U.S. Application Data division of application No. 13/485,398, filed on May 31, 2012, now Pat. No. 9,118,425.

(51) Int. Cl.
*H04N 21/231* (2011.01)
*H04N 21/2368* (2011.01)
*H04N 21/242* (2011.01)
*H04N 21/2665* (2011.01)
*H04N 21/8547* (2011.01)
*H04H 20/30* (2008.01)
*H04L 29/06* (2006.01)
*H04N 21/2365* (2011.01)

(52) U.S. Cl.
CPC ....... *H04L 65/607* (2013.01); *H04N 21/2365* (2013.01); *H04N 21/2368* (2013.01); *H04N 21/23109* (2013.01); *H04N 21/23605* (2013.01); *H04N 21/23608* (2013.01); *H04N 21/23611* (2013.01); *H04N 21/242* (2013.01); *H04N 21/2665* (2013.01); *H04N 21/8547* (2013.01)

(58) Field of Classification Search
CPC ......... H04N 21/23608; H04N 21/8547; H04N 21/2365; H04N 21/2368; H04N 21/242; H04N 21/2665; H04H 20/30; H04L 65/4076; H04L 65/607
See application file for complete search history.

(56) References Cited

U.S. PATENT DOCUMENTS

| | | | |
|---|---|---|---|
| 9,277,254 B2 | 3/2016 | Ucar | |
| 9,680,601 B2* | 6/2017 | Hong | H04L 1/0041 |
| 2004/0098398 A1* | 5/2004 | Ahn | G06F 17/30017 |
| 2004/0213298 A1 | 10/2004 | Sato | |
| 2005/0190872 A1 | 9/2005 | Seong et al. | |
| 2006/0064716 A1* | 3/2006 | Sull | G06F 17/30793 |
| | | | 725/37 |
| 2008/0282060 A1* | 11/2008 | Kirsch | G06F 9/3879 |
| | | | 712/14 |
| 2009/0049073 A1 | 2/2009 | Cho | |
| 2010/0142915 A1* | 6/2010 | McDermott | G11B 27/034 |
| | | | 386/343 |
| 2011/0170539 A1 | 7/2011 | Beheydt et al. | |
| 2013/0279380 A1* | 10/2013 | Hong | H04H 20/72 |
| | | | 370/310 |
| 2013/0308505 A1* | 11/2013 | Hong | H04B 7/0413 |
| | | | 370/310 |
| 2013/0322466 A1 | 12/2013 | Ucar | |
| 2015/0058908 A1* | 2/2015 | Ko | H04N 21/6112 |
| | | | 725/116 |
| 2015/0326894 A1 | 11/2015 | Ucar | |

FOREIGN PATENT DOCUMENTS

| | | |
|---|---|---|
| JP | 2007295609 A | 11/2007 |
| WO | 2006126852 A1 | 11/2006 |
| WO | 2011071229 A1 | 6/2011 |

OTHER PUBLICATIONS

International Search Report and Written Opinion dated Aug. 23, 2013 for Appl No. PCT/US2013/042183.
Extended European Search Report for Application No. 13797156.0 dated Dec. 9, 2015.
Non-Final Office Action received for Patent Application Serial No. 2015-515048 dated Feb. 2, 2016.

\* cited by examiner

TRANSPORT STREAM MULTIPLEXERS AND METHODS FOR PROVIDING PACKETS ON A TRANSPORT STREAM

CROSS REFERENCE TO RELATED APPLICATION(S)

This application is a continuation of pending U.S. patent application Ser. No. 14/806,539 filed Jul. 22, 2015, which is a divisional of U.S. patent application Ser. No. 13/485,398, filed May 31, 2012, and issued as U.S. Pat. No. 9,118,425 on Aug. 25, 2015. The aforementioned applications and patent are incorporated herein by reference, in their entirety, for any purpose.

TECHNICAL FIELD

Embodiments of the invention relate generally to transport streams of compressed signals, such as audio and/or video signals.

BACKGROUND

FIG. 1 is a schematic illustration of a media system. The media system 100 may receive media from a variety of sources—with source #1, source #2, and source #3 shown in FIG. 1. A source may be any type of information (e.g. audio, video, or data) and may be digital or analog. A source may represent a program (e.g. a television or video program such as but not limited to, a movie, a news cast, a sports or other event program), or a portion of a program. In some examples, sources may include combinations of audio, video, and/or data information. Examples of data information include, for example subtitles or other digital information.

The information from the sources may be encoded by an appropriate encoder, e.g. the encoders 105-107 shown in FIG. 1. The encoders 105-107 may encode the source information in any known way, for example, to compress the information. The encoders 105-107 may implement any appropriate encoding methodology for the information including, but not limited to MPEG-2, MPEG-4, H.264, H.HEVC, or combinations of these or other encoding standards. Encoded data may then be provided to a transport multiplexer 110.

The transport multiplexer 110 may receive the encoded data from multiple sources, and interleave them into a transport stream 115. The transport multiplexer 110 generally provides the received data as packets on the transport stream 115. Each transport stream packet may conventionally be 188 bytes, with a 4 byte header identifying the packet followed by control data, optional timing information, and a section of compressed data from one of the sources. A bitrate of the transport stream 115 is typically constant, e.g. the number of transport stream packets transmitted per second may be fixed. Stuffing packets may accordingly be inserted by the transport multiplexer 110 when insufficient data is available to fill the target bitrate.

Accordingly, the transport multiplexer 110 may serially provide packets of encoded data from selected sources to the transport stream 115. The transport stream 115 may be provided to any number of destinations that may unpack and decode the transport stream 115 and/or re-broadcast the transport stream 115. Examples of destinations include a satellite 120, terrestrial antenna 121, and network 122. Playback devices (e.g. set-top boxes) may also receive and decode the transport stream 115 for playback in some examples.

DETAILED DESCRIPTION

Certain details are set forth below to provide a sufficient understanding of embodiments of the invention. However, it will be clear to one skilled in the art that embodiments of the invention may be practiced without various of these particular details. In some instances, well-known circuits, control signals, timing protocols, and software operations have not been shown in detail in order to avoid unnecessarily obscuring the described embodiments of the invention.

Embodiments of the present invention include systems and methods for providing packets in a transport stream. As described above, a transport multiplexer may provide packets in a transport stream, where the packets are received from multiple sources. However, each source may have specific timing requirements. If a packet of encoded data from a source is sent out too late, the destination may have insufficient time to process the encoded data. If a packet of encoded data from a source is sent out too early, there may be insufficient space at the destination to buffer the data until the correct time is reached.

Transport multiplexers, which may be implemented in software, hardware, firmware, or combinations thereof, typically require more CPU time as the number of inputs to the transport multiplexer increases. This is because convention transport multiplexers may identify and evaluate all sources that have provided data that could be provided on the transport stream. The conventional multiplexer may, after evaluating all the sources, select a source having an earliest deadline and provide a packet from that source on the transport stream. Accordingly, as the sources (e.g. inputs) increase, so does the amount of CPU cycles required to evaluate the deadline of all sources. Accordingly, conventional transport multiplexers may require parallel processing using, for example, and FPGA, or a significant number of CPU cycles. These solutions may be costly and may disadvantageously increase a power demand of the system.

Embodiments of the present invention include transport multiplexers, methods, and systems, for providing packets on a transport stream. Embodiments of the present invention may reduce the CPU cycles and/or complexity required to determine which source to use for each packet of the transport stream. While some advantages of certain embodiments of the present invention are described herein, it is to be understood the advantages are provided by way of explanation only, and not all embodiments may enjoy all, or even any, of the described benefits.

Figure 1:
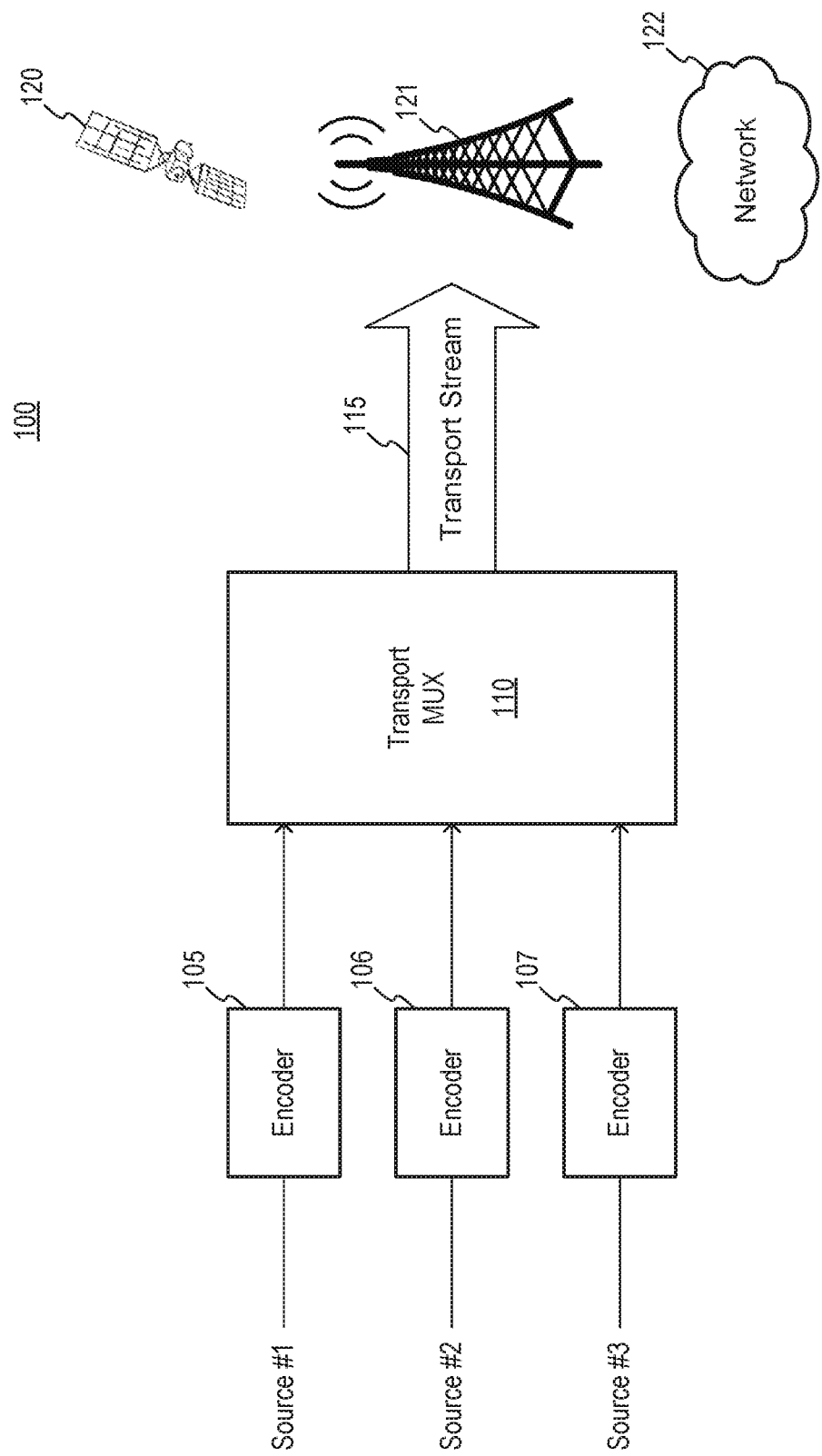
FIG. 1 is a schematic illustration of a media system.
Figure 2:
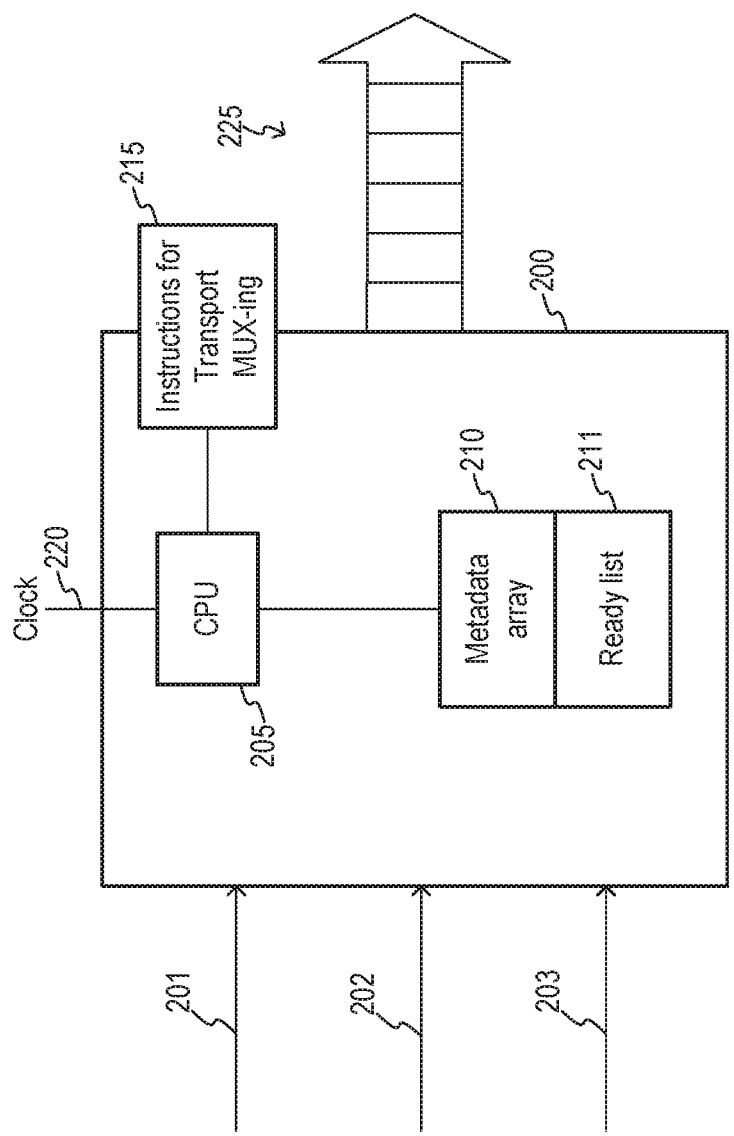
FIG. 2 is a schematic illustration of a transport multiplexer in accordance with an embodiment of the present invention.

FIG. 2 is a schematic illustration of a transport multiplexer in accordance with an embodiment of the present invention. The transport multiplexer 200 may receive data (e.g. encoded data) from a variety of sources, with sources 201-203 shown in FIG. 2. As described above, the sources 201-203 may be encoded video, encoded audio, data, or the like, and each source may be from a program or portion thereof. In some examples, multiple sources may originate from a same program or portion thereof (e.g. audio, video, and data pertaining to a single program). A source of stuffing packets may also be provided to the transport stream multiplexer. Generally, stuffing packets may include data that may be unrelated to any content intended to be transmitted on the transport stream. Instead, the stuffing packets may be inserted on the transport stream to maintain a constant bit rate. It is to be understood that the nature and type of sources that may provide data to the transport multiplexer 200 are varied and flexible, and generally any source capable of providing data for transmission over a transport stream may be used. Further, any number of sources may be used. Any number of sources may be used, up to 16 programs in one example, up to 42 programs in another example, over 1000 source in another examples. Examples implementing transport streams for Ethernet systems, such as 1 Gbit Ethernet may have large numbers of sources, over 1000 in some examples.

The transport multiplexer 200 includes a CPU 205, a metadata array 210, ready list 211, and instructions for transport multiplexing 215. Any suitable processor or multiple processors may be used to implement the CPU 205. The metadata array 210 may be implemented in any suitable form of memory readable by the CPU 205, for example volatile or non-volatile memory, as may the ready list 211. The instructions for transport multiplexing 215 may be computer-readable instructions stored on any suitable memory readable by the CPU 205, for example volatile or non-volatile memory. The instructions for transport multiplexing 215, the metadata array 210, and/or the ready list 211 may be stored on a same memory, or may be stored on different memories. In some examples, any combination or all of the metadata array 210, the ready list 211 and the instructions for transport multiplexing 215 may be distributed across multiple memories. It is to be understood that the arrangement of processing and memory components used to implement examples of transport multiplexers described herein is quite flexible. Generally, sufficient hardware, software, or combinations thereof may be provided to perform the transport multiplexer functionalities described.

The transport multiplexer 200 may operate in accordance with a clock signal 220, which may be provided to the CPU 205. The transport multiplexer 200 may operate to place packets of data from selected sources on the transport stream 225. Generally, the CPU 205 may operate in accordance with the instructions for transport multiplexing 215 to read the metadata array 210, and select a source specified by the metadata array 210. Data from the selected source may be placed on the transport stream 225. The ready list 211 may contain packet data waiting to be placed in the metadata array 210. In this manner, the CPU 205 may only need to consult the metadata array 210 to determine which source to use to assemble a packet of data to place on the transport stream 225. The CPU 205 may accordingly not need to evaluate each source and the relative timing requirements of each source in order place a packet on the transport stream 225.

After the transport multiplexer 200 has identified the source to use for a next transport stream packet, based on information stored in the metadata array 210, the CPU 205, in accordance with the instructions for transport multiplexing 215, may determine a next packet location for the selected source. The next packet location for the selected source may be determined based on timing requirements of the selected source, in combination with other factors in some examples. The CPU 205, in accordance with the instructions for transport multiplexing 215, may store metadata identifying the selected source in a location of the metadata array 210 associated with the next packet location for the selected source. Accordingly, the metadata array 210 may be updated to reflect selected sources for future packets. In this manner, the CPU 205 may not need to search all sources to determine a selected source for use in providing a next transport stream packet. The CPU 205 may instead select a source based on information stored in the metadata array 210, and may update the metadata array 210 by storing metadata identifying the selected source in a location corresponding to a next transport packet location for that selected source.

Figure 3:
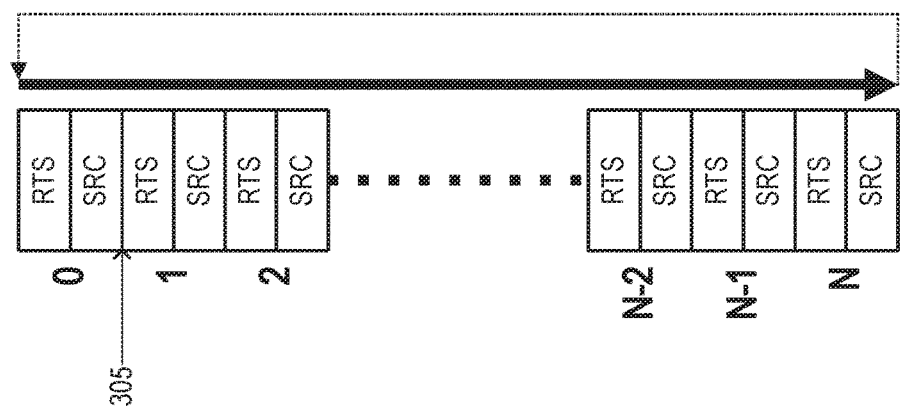
FIG. 3 is a schematic illustration of a metadata array in accordance with an embodiment of the present invention.

FIG. 3 is a schematic illustration of a metadata array in accordance with an embodiment of the present invention. The metadata array 300 may be used to implement the metadata array 210 of FIG. 2, for example. The metadata array 300 includes N entries. Each entry may include a release time stamp (RTS) and source indicator (SRC). Each entry may correspond with a packet on the transport stream. The release time stamp may correspond with a time the packet associated with that entry should be placed on the transport stream. The source indicator may indicate which source should be used to obtain data for that packet. The metadata array 300 may be operated as a first-in first-out (FIFO) memory in which the first entry placed in the metadata array 300 may be the first entry to be read out. An index pointer 305 may point to a current location in the metadata array 300 corresponding to a current packet. The index pointer 305 may be incremented after each entry is read from the metadata array 300. The metadata array may be implemented using any memory device.

Figure 4:
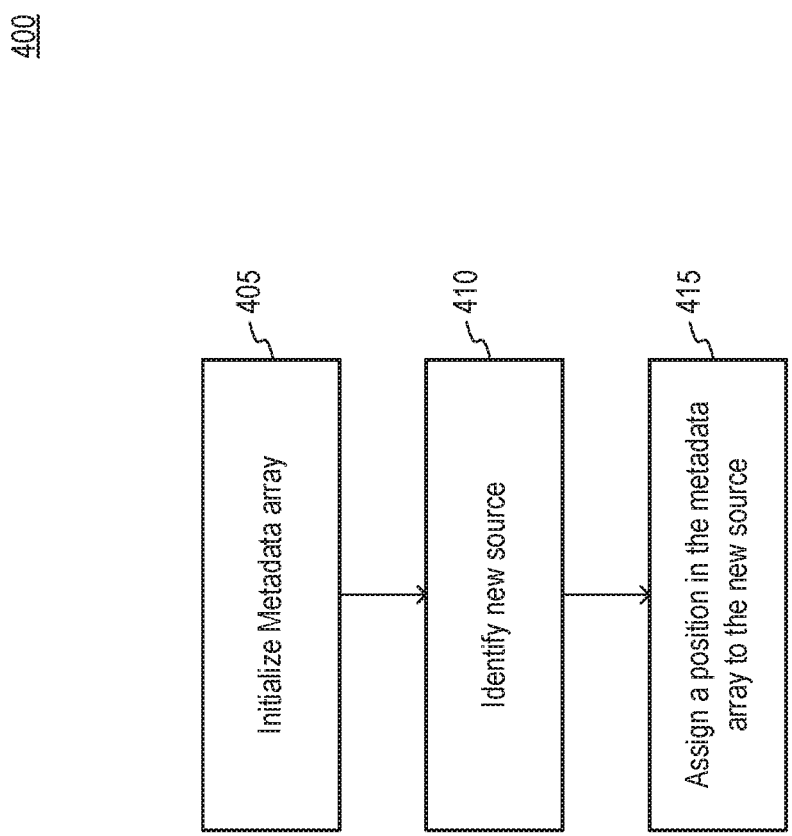
FIG. 4 is a schematic illustration of a method of populating a metadata array in accordance with an embodiment of the present invention.

FIG. 4 is a schematic illustration of a method of populating a metadata array in accordance with an embodiment of the present invention. The method 400 may be used to populate the metadata array 300 of FIG. 3, for example. The instructions for transport multiplexing 215 of FIG. 2 may include instructions for performing the method for initializing described with reference to FIG. 4. Referring to FIG. 4, at block 405, the metadata array may be initialized. The CPU 205 of FIG. 2 may initialize the metadata array 210 in accordance with the instructions for transport multiplexing 215, for example. Initializing may occur when the transport multiplexer is turned on or started up, in some examples, or the array may be provided already initialized. In some examples, initializing may include allocating sufficient space in memory for the metadata array. The amount of space may generally be a space large enough to hold the release time stamp and source indicator for all N packets.

During initialization, release time stamp values may be stored in each of the metadata array locations. The release time stamp values may be calculated based on a system clock used by the transport multiplexer, such as the clock signal 220 of FIG. 2. A number of transport stream packets on the transport stream per second (NUM_TS_PKT) may be given as the transport stream bit rate divided by the size of the transport packets. In one example NUM_TS_PKT may be given as TS_BR/(188*8), where TS_BR is the transport stream bit rate and each transport stream is 188 bytes*8 bits/byte. Accordingly, the increment between release time stamps (e.g. ΔRTS) may be given as the frequency of the clock signal divided by the number of transport stream packets on the transport stream per second (NUM_TS_PKT). In one example, the clock signal may have a frequency of 27 MHz, and the ΔRTS may accordingly be given as 27000000/NUM_TS_PKT. Accordingly, during initialization a start release time stamp may be written in entry 0 of the metadata array. The start release time stamp may be the current time or any other time at which packet 0 is to be placed on the transport stream. The remaining release time stamps may be written to the remaining entries by incrementing the start release time stamp by ΔRTS.

During initialization, source indicators may also be stored in each of the metadata array locations. A predetermined combination of source indicators may be written initially to each location. In one example, the source indicator for each location is initialized to a stuffing packet source. In some examples, the CPU 205 may perform the above-described calculations and write the initial release time stamps and source indicators in accordance with the instructions for transport multiplexing 215. Following initialization, the metadata array 300 of FIG. 3 may include release time stamps for each of N packets and associate source indicators, which may all be initialized to stuffing packets.

Referring again to FIG. 4, in block 410, a new source may be identified. The source may be identified because data from the source begins to arrive at the transport multiplexer, or in some examples a predetermined list of sources may be known to the transport multiplexer and the transport multiplexer may evaluate the predetermined list of sources. In block 415, a position in the metadata array may be assigned to the new source. For example, the transport multiplexer may evaluate a time the source requires to provide a packet on the transport stream. The current time may be subtracted from the required send time. The difference may be divided by ΔRTS to identify which entry of the metadata array should correspond with anent packet from the source. For example, the entry of the metadata array that should be associated with the new source=(time required to send packet−current time)/ΔRTS. A source indicator corresponding to the new source may then be placed at the metadata array entry calculated in this manner. If the metadata array entry is larger than N, it may not yet fit in the metadata array, and the release time stamp and source indicator may be stored in the ready list 211 instead of the metadata array 210.

Block 410 of FIG. 4 may be repeated for any number of sources in communication with the transport multiplexer. Sometimes, a conflict may be encountered where the calculation mentioned above may suggest a source indicator should be placed at a metadata array location already occupied by another non-stuffing packet source indicator. In such a conflict, the transport multiplexer may read the next metadata array location, and if the next metadata array location includes a source indicator of a stuffing packet, the conflicted source indicator may be written to that next metadata array location. Blocks 410 and 415 may be performed, for example, by CPU 205 in accordance with the instructions for transport multiplexing 215.

Figure 5:
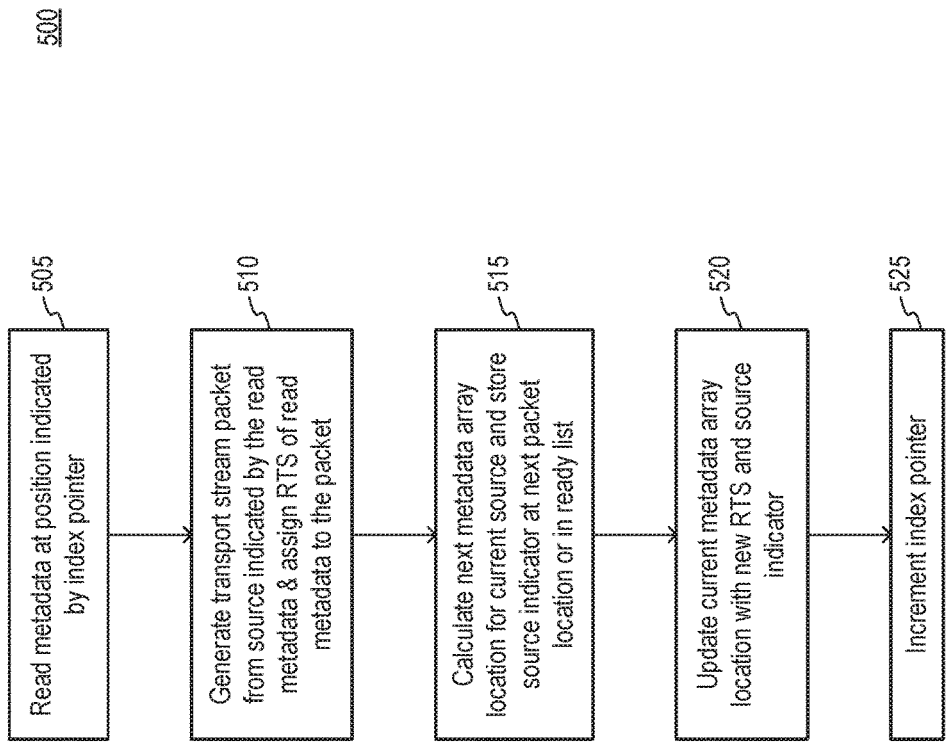
FIG. 5 is a schematic illustration of a method for providing transport stream packets.

FIG. 5 is a schematic illustration of a method for providing transport stream packets. Although the blocks of the method FIG. 5 are shown in a linear order, it is to be understood that the order of performance of the described elements of the method 500 may be flexible, and some elements may overlap in their execution. The method 500 may be performed, in some examples, by the CPU 205 of FIG. 2 acting in accordance with the instructions for transport stream multiplexing 215, which may include instructions for performing the method 500. In block 505, metadata may be read at a position indicated by an index pointer of a metadata array. For example, referring to the metadata array 300 of FIG. 3, the location '1' may be read, and the RTS and source indicator at '1' may be read, for example by the CPU 205 of FIG. 2 acting in accordance with the instructions for transport stream multiplexing 215.

In block 510, a packet may be provided by the transport stream multiplexer based on the data read from the metadata array. For example, the transport stream multiplexer may generate a transport stream packet from the source indicated at the read location (e.g. the source specified at location '1' in the example of FIG. 3), and the RTS of the read location may be assigned to the generated transport stream packet. Accordingly, the transport stream may provide the generated transport stream packet on the transport stream when the clock signal corresponds with the RTS of the transport stream packet.

In block 515, a next metadata array location may be calculated for the current source (e.g. the source used to generate the packet in block 510). The next metadata array location may be calculated, for example, based on the leak rate of the current source. Each source may have a specified leak rate which corresponds with a rate at which consecutive packets from that source should be placed on the transport stream. The transport multiplexer may accordingly calculate the next metadata array location based on the system clock, bit rate, transport packet size, and leak rate. A source indicator for the current source may then be stored at that calculated location. Note, however, that the metadata array may be finite, e.g. N entries in length. Accordingly, if the next metadata array location is calculated to be a location greater than N, the transport multiplexer may store the source indicator for the current source in a ready list, e.g. the ready list 211 of FIG. 2, and a target RTS for the next packet from the current source may also be stored in the ready list.

In block 520, the transport multiplexer may update the current metadata array location with an updated RTS and source indicator. The updated RTS may be equal to the current RTS plus N*ΔRTS, because the index pointer may be expected to return to a same location of the metadata array every N*ΔRTS. The source indicator may be updated to indicate a stuffing packet source, because no source may yet have been assigned to the location for the updated RTS value.

In block 525, the transport multiplexer may increment the index pointer, such as the index pointer 305 of FIG. 3, for example. In the example of FIG. 3, the index pointer may be incremented to location '2'. When the index pointer is at location 'N', incrementing the index pointer may result in the index pointer pointing at location '0'. Accordingly, the index pointer may 'wrap around' the metadata array. Also, when the index pointer is at location 'N', generally each entry of the metadata array may have been read and corresponding transport stream packets generated by the transport stream multiplexer. In accordance with the process described above with reference to block 520, after reading each of the metadata array locations, their source indicators may have been updated to stuffing packet source indicators. Accordingly, the metadata array may have been re-initialized.

When the index pointer is incremented from location 'N' to location '0', the transport stream multiplexer may evaluate the ready list, such as the ready list 211 of FIG. 2. Recall the ready list may include source indicators and target RTS values for metadata array locations that had been greater than N. In some examples, the ready list may be organized by source. For each entry in the ready list, the transport multiplexer may calculate the metadata array location for the entry using methods described above. For example, the metadata array location may be calculated by subtracting the current time from the RTS stored in the ready list and dividing the remainder by $\Delta$RTS. If the metadata array location is larger than N, the transport stream multiplexer may leave the source and RTS in the ready list. If the metadata array location is N or less, the source indicator at the calculated metadata array location may be updated to reflect the appropriate source as indicated by the ready list as long as that metadata array location is not already storing a non-stuffing packet source indicator. If the metadata array location is storing a non-stuffing packet source indicator, the transport stream multiplexer may store the source indicator and RTS in the next metadata array location, or in some examples, any next metadata array location not currently storing a non-stuffing packet source indicator. Once the source indicator and RTS have been stored at an appropriate location in the metadata array, the transport stream multiplexer may remove them from the ready list.

While examples have been described above where the transport stream multiplexer may increment the index pointer through all N entries of the metadata array before evaluating the ready list, in some examples the ready list may be evaluated more frequently to update the metadata array with source indicators more frequently.

Examples of the present invention accordingly may provide transport stream multiplexers that may not need to search for an appropriate source to use to generate a transport stream packet. Instead, the source to use is indicated by an entry in a memory table, e.g. a metadata array. Since the sum of all source bitrates is less than the transport stream bit rate, and the source indicators may be advanced in accordance with the source leak rates, conflict is not expected to occur that frequently when updating the metadata array in examples of the present invention. Moreover, examples of the present invention may minimize or reduce a number of CPU cycles required to operate the transport stream multiplexer, relatively independent of the number of sources provided to the transport stream multiplexer. This is because each source need not be evaluated each time a next packet is to be generated in some examples.

The performance of transport stream multiplexers in accordance with some examples of the present invention may improve as the size N of the metadata array increases, since probability of a source being directed to the ready list may go down. However, this advantage may diminish after some size since generally only one entry per source may be maintained in the metadata array at any given time in some examples. The size of the array N may accordingly be selected in some examples such that $N*\Delta RTS$ is greater than the clock frequency divided by a lowest frame or repeat rate of the sources.

In some examples, the availability of stuffing packets may facilitate performance benefit, because a bitrate of the transport stream may be more than the aggregate bitrate of all the contributing sources. Generally, if aggregate bitrate becomes larger than the transport stream bitrate, performance of some examples may degrade.

Examples of transport stream multiplexers and methods described herein may also be implemented using a cascaded multiplexer. Part of the transport stream may be multiplexed initially prior to being provided to a transport stream multiplexer in accordance with an embodiment of the present invention. Any premuxed stream may be provided as an input to the downstream multiplexer implemented in accordance with embodiments of the present invention. Non stuffing packets may be re-multiplexed using the RTS provided by the upstream multiplexer or based on capture time of the downstream multiplexer.

In an analogous manner, examples of the present invention may include grooming transport stream multiplexers where one or more high bitrate sources (e.g. programs) may be removed for transcoding and maintaining bitrate. For example, the transport stream containing non-transcoded packets may be provided as an input to a transport stream multiplexer in accordance with embodiments of the present invention in an analogous manner to the provision of pre-muxed stream in the example of a cascaded multiplexer.

Figure 6:
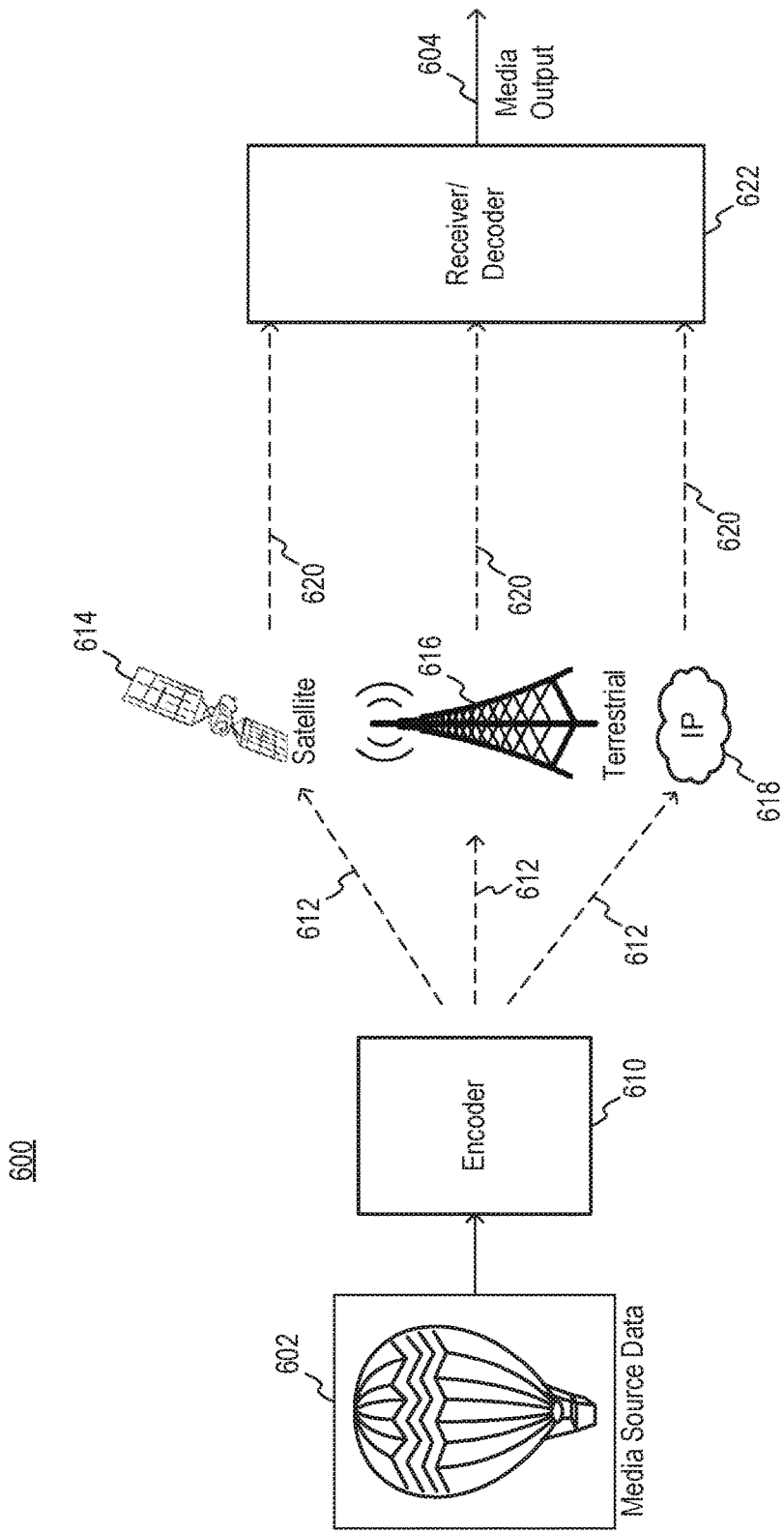
FIG. 6 is a schematic illustration of a media delivery system in accordance with embodiments of the present invention.

FIG. 6 is a schematic illustration of a media delivery system in accordance with embodiments of the present invention. The media delivery system 600 may provide a mechanism for delivering a media source 602 to one or more of a variety of media output(s) 604. Although only one media source 602 and media output 604 are illustrated in FIG. 6, it is to be understood that any number may be used, and examples of the present invention may be used to broadcast and/or otherwise deliver media content to any number of media outputs.

The media source data 602 may be any source of media content, including but not limited to, video, audio, data, or combinations thereof. The media source data 602 may be, for example, audio and/or video data that may be captured using a camera, microphone, and/or other capturing devices, or may be generated or provided by a processing device. Media source data 602 may be analog or digital. When the media source data 602 is analog data, the media source data 602 may be converted to digital data using, for example, an analog-to-digital converter (ADC). Typically, to transmit the media source data 602, some type of compression and/or encryption may be desirable. Accordingly, an encoder 610 may be provided that may encode the media source data 602 using any encoding method in the art, known now or in the future, including encoding methods in accordance with video standards such as, but not limited to, MPEG-2, MPEG-4, H.264, H.HEVC, or combinations of these or other encoding standards.

The encoded data 612 may be provided to a communications link, such as a satellite 614, an antenna 616, and/or a network 618. The encoded data 612 may be provided to the communications link using a transport stream prepared in accordance with embodiments of the present invention. For example, the transport stream multiplexer 200 of FIG. 2 and/or the methods of FIGS. 4 and 5 may be used to provide the encoded data 612 to a communications link. The network 618 may be wired or wireless, and further may communicate using electrical and/or optical transmission. The antenna 616 may be a terrestrial antenna, and may, for example, receive and transmit conventional AM and FM signals, satellite signals, or other signals known in the art. The communications link may broadcast the encoded data 612, and in some examples may alter the encoded data 612 and broadcast the altered encoded data 612 (e.g. by re-encoding, adding to, or subtracting from the encoded data 612). The encoded data 620 provided from the communications link may be received by a receiver 622 that may include or be coupled to a decoder. The decoder may decode the encoded data 620 to provide one or more media outputs, with the media output 604 shown in FIG. 6.

The receiver 622 may be included in or in communication with any number of devices, including but not limited to a modem, router, server, set-top box, laptop, desktop, computer, tablet, mobile phone, etc.

Figure 7:
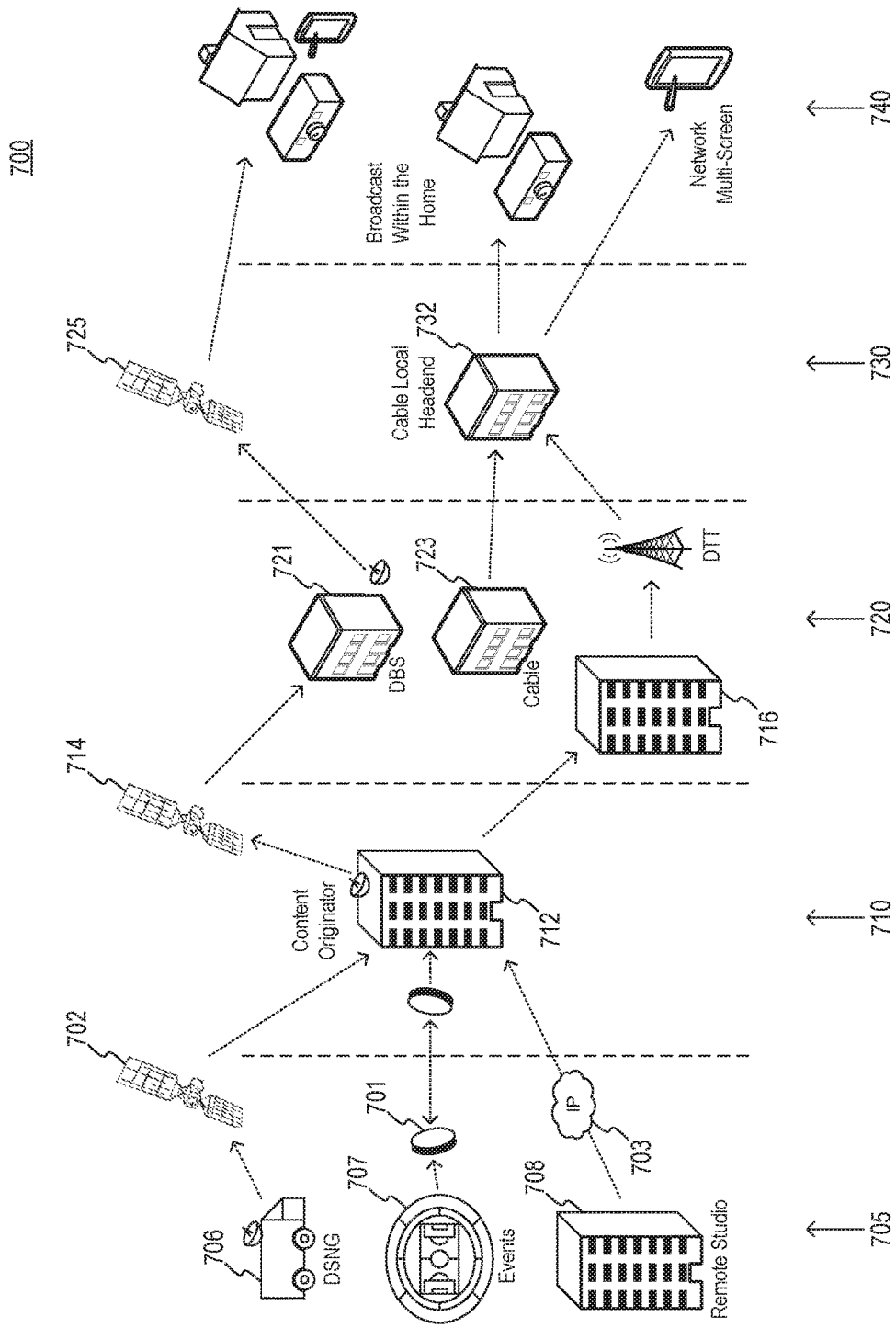
FIG. 7 is a schematic illustration of a video distribution system that may make use of encoders described herein.

The media delivery system 600 of FIG. 6 and/or the encoder 610 may be utilized in a variety of segments of a content distribution industry. FIG. 7 is a schematic illustration of a video distribution system that 700 may make use of encoders described herein. The video distribution system 700 includes video contributors 705. The video contributors 705 may include, but are not limited to, digital satellite news gathering systems 706, event broadcasts 707, and remote studios 708. Each or any of these video contributors 705 may utilize an encoder described herein, such as the encoder 610 of FIG. 6, to encode media source data and provide encoded data to a communications link. Moreover, each or any of these video contributors 705 may use embodiments of transport stream multiplexers and/or methods described herein, such as the transport stream multiplexer 200 of FIG. 2 and methods of FIGS. 4 and 5 to provide transport streams. For example, the digital satellite news gathering system 706 may provide encoded data to a satellite 702 using an example transport stream multiplexer as described herein. The event broadcast 707 may provide encoded data to an antenna 701 using an example transport stream multiplexer as described herein. The remote studio 708 may provide encoded data over a network 703 using an example transport stream multiplexer as described herein. Other communications links may be used with others of these systems in other examples.

A production segment 710 may include a content originator 712. The content originator 712 may receive encoded data from any or combinations of the video contributors 705. The content originator 712 may make the received content available, and may edit, combine, and/or manipulate any of the received content to make the content available. The content originator 712 may utilize encoders described herein, such as the encoder 610 of FIG. 6, to provide encoded data to the satellite 714 (or another communications link). The content originator 712 may include a transport stream multiplexer described herein to provide the encoded data to the satellite 714 (or another communications link). The content originator 712 may, in addition or instead, provide encoded data to a digital terrestrial television system 716, over a network or other communication link, and may utilize example transport stream multiplexers described herein. In some examples, the content originator 712 may utilize a decoder, such as the decoder described with reference to FIG. 6, to decode the content received from the contributor(s) 705. The content originator 712 may then re-encode data and provide the encoded data to the satellite 714, which may also utilize examples of transport stream multiplexers described herein. In other examples, the content originator 712 may not decode the received data, and may utilize a transcoder to change an encoding format of the received data.

A primary distribution segment 720 may include a digital broadcast system 721, the digital terrestrial television system 716, and/or a cable system 723. The digital broadcasting system 721 may include a receiver, such as the receiver 622 described with reference to FIG. 6, to receive encoded data from the satellite 714. The digital terrestrial television system 716 may include a receiver, such as the receiver 622 described with reference to FIG. 6, to receive encoded data from the content originator 712. The cable system 723 may host its own content which may or may not have been received from the production segment 710 and/or the contributor segment 705. For example, the cable system 723 may provide its own media source data 602 as that which was described with reference to FIG. 6.

The digital broadcast system 721 may include an encoder, such as the encoder 610 described with reference to FIG. 6, to provide encoded data to the satellite 725. The digital broadcast system 721 may include an example of a transport stream multiplexer described herein, such as the transport stream multiplexer 200 of FIG. 2. The cable system 723 may include an encoder, such as the encoder 610 described with reference to FIG. 6, to provide encoded data over a network or other communications link to a cable local headend 732. The cable system 723 may include one or more examples of transport stream multiplexers described herein. A secondary distribution segment 730 may include, for example, the satellite 725 and/or the cable local headend 732.

The cable local headend 732 may include an encoder, such as the encoder 610 described with reference to FIG. 6, to provide encoded data to clients in a client segment 640 over a network or other communications link. The cable local headend 732 may include examples of transport stream multiplexers described herein. The satellite 725 may broadcast signals to clients in the client segment 740. The client segment 740 may include any number of devices that may include receivers, such as the receiver 622 and associated decoder described with reference to FIG. 6, for decoding content, and ultimately, making content available to users. The client segment 740 may include devices such as set-top boxes, tablets, computers, servers, laptops, desktops, cell phones, etc.

Accordingly, encoding, transcoding, transport stream multiplexing, and/or decoding, may be utilized at any of a number of points in a video distribution system. Embodiments of the present invention may find use within any, or in some examples all, of these segments.

From the foregoing it will be appreciated that, although specific embodiments of the invention have been described herein for purposes of illustration, various modifications may be made without deviating from the spirit and scope of the invention.

What is claimed is:

1. A method, comprising:
    reading a metadata array at a position indicated by an index pointer, wherein a release time stamp is stored at the position in the metadata array;
    assigning an assigned release time stamp to a transport stream packet based on the release time stamp stored at the position indicated by the index pointer; and
    providing, using a transport stream multiplexer, the transport stream packet on the transport stream at a time corresponding to the assigned release time stamp.

2. The method of claim 1, wherein a source indicator is stored at the position in the metadata array.

3. The method of claim 2, wherein the transport stream packet is generated from a source indicated by the source indicator.

4. The method of claim 2, further comprising:
    calculating a next metadata array location for the source indicated by the source indicator stored at the position indicated by the index pointer;
    storing a corresponding source indicator at the next metadata array location if the next metadata array location is within the metadata array; and storing the corresponding source indicator in a ready list if the next metadata array location is not currently within the metadata array.

5. The method of claim 4, wherein said calculating the next metadata array location is based on a leak rate of the source indicated by the source indicator.

6. The method of claim 4, wherein said calculating the next metadata array location is based on a system clock frequency used by the transport stream multiplexer.

7. The method of claim 1, further comprising updating the metadata array at the position indicated by the index pointer by storing an updated release time stamp.

8. The method of claim 7, wherein the updated release time stamp is based on a size of the metadata array.

9. The method of claim 7, further comprising updating the metadata array at the position indicated by the index pointer by storing an updated source indicator.

10. The method of claim 9, wherein the updated source indicator corresponds to a source of stuffing packets.

11. A transport stream multiplexer comprising:
a processor; and
a memory configured to store (i) instructions for transport stream multiplexing; and
(ii) a metadata array having consecutive locations corresponding to consecutive packets of a transport stream, wherein (a) each of the consecutive locations stores a release time stamp; and
(b) the processor is configured, in accordance with the instructions for transport stream multiplexing, to read a location of the metadata array, and provide a transport stream packet on the transport stream at a time corresponding with the release time stamp at the read location of the metadata array.

12. The transport stream multiplexer of claim 11, wherein each of the consecutive locations includes a source indicator.

13. The transport stream multiplexer of claim 12, wherein the processor is further configured, in accordance with the instructions for transport stream multiplexing, to generate the transport stream packet from a source specified by the source indicator at the read location of the metadata array.

14. The transport stream multiplexer of claim 13, wherein (i) the transport stream multiplexer is in communication with a plurality of sources, and (ii) the source specified by the source indicator at the read location is a selected one of the plurality of sources.

15. The transport stream multiplexer of claim 11, further comprising a ready list, wherein the ready list is configured to store release time stamps for packets which do not have a corresponding location in the metadata array.

16. The transport stream multiplexer of claim 15, wherein the processor is further operable, in accordance with the instructions for transport stream multiplexing, to provide packets on the transport stream corresponding to each of the consecutive locations in the metadata array and update the metadata array using data stored in the ready list.

17. The transport stream multiplexer of claim 11, wherein the metadata array comprises a first-in first-out (FIFO) memory.

18. The transport stream multiplexer of claim 11, further configured to receive a clock signal, wherein a time corresponding with the release time stamp at the read location of the metadata array is based, at least in part, on the clock signal.

19. The transport stream multiplexer of claim 11, wherein the processor is further configured to update the metadata array by storing an updated release time stamp.

20. The transport stream of claim 19, wherein the updated release time stamp is based on a size of the metadata array.

* * * * *